(12) United States Patent
Kusanagi et al.

(10) Patent No.: US 10,582,339 B2
(45) Date of Patent: Mar. 3, 2020

(54) DESTINATION INFORMATION RETRIEVAL DEVICE, STORAGE MEDIUM STORING PROGRAM, AND DESTINATION INFORMATION RETRIEVAL SYSTEM

(71) Applicant: Toyota Jidosha Kabushiki Kaisha, Toyota-shi, Aichi-ken (JP)

(72) Inventors: Daichi Kusanagi, Toyota (JP); Masaki Ito, Toyota (JP); Kenta Miyahara, Toyota (JP); Kihiro Kato, Tokoname (JP); Yuka Shidochi, Toyota (JP); Yohei Tanigawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/234,742

(22) Filed: Dec. 28, 2018

(65) Prior Publication Data

US 2019/0215659 A1 Jul. 11, 2019

(30) Foreign Application Priority Data

Jan. 11, 2018 (JP) .................. 2018-002730

(51) Int. Cl.
*H04W 4/024* (2018.01)
*H04W 4/21* (2018.01)
*H04W 4/40* (2018.01)

(52) U.S. Cl.
CPC ............. *H04W 4/024* (2018.02); *H04W 4/21* (2018.02); *H04W 4/40* (2018.02)

(58) Field of Classification Search
CPC .......... H04W 4/024; H04W 4/21; H04W 4/40
USPC ...................................... 455/456.3
See application file for complete search history.

(56) References Cited

U.S. PATENT DOCUMENTS

| | | | |
|---|---|---|---|
| 10,129,705 B1 * | 11/2018 | Haski | H04W 4/029 |
| 2009/0054043 A1 * | 2/2009 | Hamilton | G01S 5/0284 455/414.2 |
| 2013/0158854 A1 * | 6/2013 | Weir | G01C 21/3617 701/400 |
| 2014/0115146 A1 * | 4/2014 | Johnson | H04L 43/0876 709/224 |
| 2015/0126225 A1 | 5/2015 | Endo et al. | |
| 2016/0189228 A1 * | 6/2016 | Vaccari | G06Q 30/0261 705/14.58 |
| 2018/0352383 A1 * | 12/2018 | Subbian | H04W 4/029 |

FOREIGN PATENT DOCUMENTS

| | | |
|---|---|---|
| JP | 2013-137654 A | 7/2013 |
| JP | 5943222 B2 | 6/2016 |

* cited by examiner

*Primary Examiner* — William Nealon
(74) *Attorney, Agent, or Firm* — Dinsmore & Shohl LLP

(57) ABSTRACT

There is provided a destination information retrieval device including: a first memory; and a first processor connected to the first memory, wherein the first processor acquires posted information from a management server that manages a social networking service (SNS), determines, based on the acquired posted information and current positional information regarding a vehicle, a destination of the vehicle, and outputs the determined destination as destination information.

10 Claims, 15 Drawing Sheets

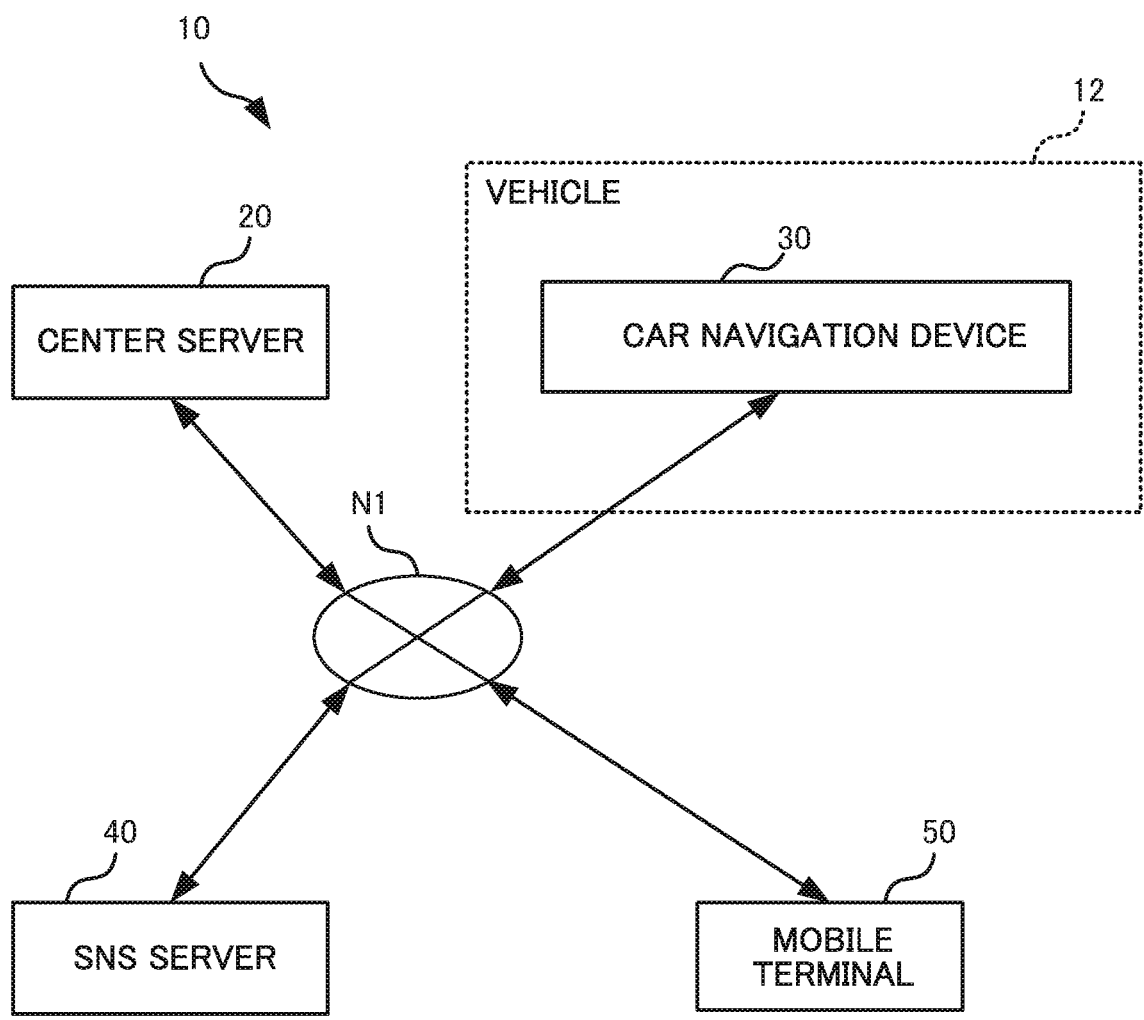

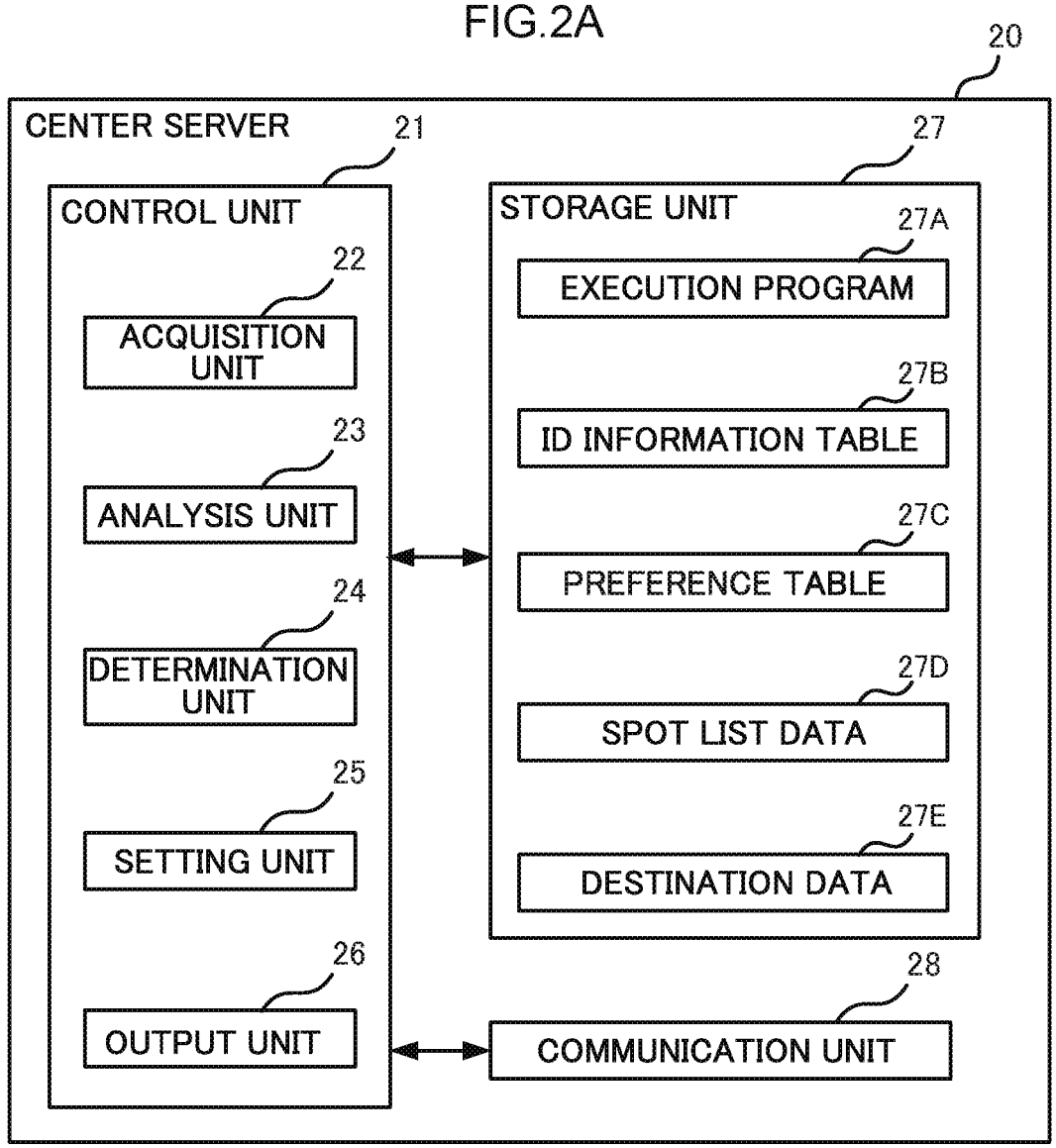
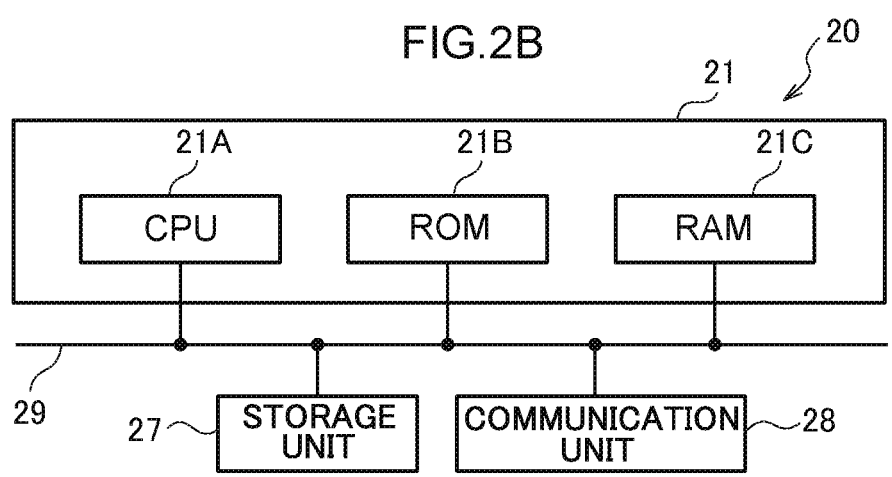

FIG.3A
CATEGORY: MEALS

| GENRE | SCORE |
|---|---|
| JAPANESE FOODS | 40 |
| WESTERN FOODS | 70 |
| CHINESE FOODS | 65 |
| CAFES | 80 |
| ⋮ | ⋮ |

FIG.3B
CATEGORY: ACTIVITIES

| GENRE | SCORE |
|---|---|
| SPORT | 60 |
| THEME PARKS | 90 |
| ART GALLERIES AND MUSEUMS | 70 |
| SHOPPING | 30 |
| ⋮ | ⋮ |

FIG.3C
CATEGORY: DRIVES AND TRAVEL

| GENRE | SCORE |
|---|---|
| SEA AND MOUNTAINS | 80 |
| HOT SPRINGS | 100 |
| GOURMETS | 60 |
| NOTED PLACES | 30 |
| ⋮ | ⋮ |

FIG.3D
CATEGORY: DISASTERS

| GENRE | SCORE |
|---|---|
| FOODSTUFFS | 100 |
| BATHING | 70 |
| POWER SOURCES | 80 |
| DIAPERS | 90 |
| ⋮ | ⋮ |

FIG.4A

| ORDER OF STOPPING OFF | DESTINATION |
|---|---|
| 1 | A MOUNTAIN ROPEWAY |
| 2 | RESTAURANT B |
| 3 | C COAST |
| 4 | ONE-DAY HOT SPRING D |
| ⋮ | ⋮ |

FIG.4B

| ORDER OF STOPPING OFF | DESTINATION |
|---|---|
| 1 | ITALIAN RESTAURANT E |
| 2 | CAFE F |
| 3 | G PATISSERIE |
| ⋮ | ⋮ |

DESTINATION INFORMATION RETRIEVAL DEVICE, STORAGE MEDIUM STORING PROGRAM, AND DESTINATION INFORMATION RETRIEVAL SYSTEM

CROSS-REFERENCE TO RELATED APPLICATION

This application is based on and claims priority under 35 USC 119 from Japanese Patent Application No. 2018-2730 filed on Jan. 11, 2018, the disclosure of which is incorporated by reference herein.

BACKGROUND

Technical Field

The present disclosure relates to a destination information retrieval device, a storage medium storing a program, and a destination information retrieval system.

Related Art

In recent years, social networking services, such as LINE (registered trademark), Twitter (registered trademark), Facebook (registered trademark), and Instagram (registered trademark), (hereinafter collectively referred to as an "SNS") have been frequently used along with the spread of mobile terminals, such as smartphones and tablet terminals.

Posted information in the SNS may be also used in an on-vehicle device, such as car navigation device. For example, Japanese Patent No. 5943222 discloses a technique of acquiring posted information regarding positional information in an SNS and displaying the acquired information together with map information. The on-vehicle device enables an occupant in a vehicle that is traveling to obtain useful information.

SUMMARY

The on-vehicle device described in Japanese Patent No. 5943222 reflects the positional information and the posted information in the SNS corresponding to the positional information, onto a map, namely, provides the posted information in the SNS to the occupant in the vehicle.

In a case in which the preference of the occupant or a trend in the world can be grasped from the posted information in the SNS, a recommended traveling route can be provided to the occupant.

In consideration of the point, an object of the present disclosure is to provide a recommended traveling route to an occupant in a vehicle, using posted information in an SNS.

A first aspect is a destination information retrieval device including: a first memory; and a first processor connected to the first memory. The first processor acquires posted information from a management server that manages a social networking service (SNS), determines, based on the acquired posted information and current positional information regarding a vehicle, a destination of the vehicle, and outputs the determined destination as destination information.

The destination information retrieval device of the first aspect acquires the posted information of a user in the SNS, generates the destination information for creating a traveling route, on the basis of the acquired posted information and the current positional information regarding the vehicle, and outputs the destination information. This destination information retrieval device can provide a recommended traveling route to an occupant in the vehicle, using the posted information in the SNS.

A second aspect is the destination information retrieval device, in which the first processor acquires the posted information, which has been posted by a specific user who rides in the vehicle, analyzes a preference of the specific user, based on the acquired posted information posted by the specific user, and determines the destination, based on the current positional information regarding the vehicle and the preference of the specific user.

The destination information retrieval device of the second aspect analyzes the post by the specific user in the SNS, so that the preference of the specific user can be reflected onto the traveling route.

A third aspect is the destination information retrieval device, in the first processor, the preference of the specific user is set by the specific user who rides in the vehicle.

The destination information retrieval device of the third aspect can reflect the preference of the specific user onto the traveling route in advance.

A fourth aspect is the destination information retrieval device, in which the first processor determines, for the vehicle, an order of stopping off at a plurality of the destinations, and outputs the destination information to which the order of stopping off has been added.

The destination information retrieval device of the fourth aspect can set a recommended order of stopping off to the plurality of destinations.

A fifth aspect is a storage medium storing a program for causing a first processor to execute destination information retrieval processing, the destination information retrieval processing including: acquiring posted information from a management server that manages a social networking service (SNS); determining, based on the acquired posted information and current positional information regarding a vehicle, a destination of the vehicle; and outputting the determined destination as destination information.

The storage medium of the fifth aspect, can provide a recommended traveling route to an occupant in the vehicle, using the posted information in the SNS.

A sixth aspect is a destination information retrieval system including: the destination information retrieval device of any one of aspects 1 to 4; and a positional information provision device capable of transmitting the current positional information regarding the vehicle to the destination information retrieval device. The positional information provision device includes: a second memory; and a second processor connected to the second memory. The second processor optimizes a traveling route of the vehicle, based on the destination information received from the destination information retrieval device; and issues a notification of the optimized traveling route.

The destination information retrieval system of the sixth aspect, can provide a recommended traveling route to an occupant in the vehicle, using the posted information in the SNS.

A seventh aspect is a destination information retrieval system including: the destination information retrieval device according to any one of aspects 1 to 4; a mobile terminal registered in the destination information retrieval device; and a positional information provision device capable of transmitting the current positional information regarding the vehicle to the destination information retrieval device. The positional information provision device includes: a second memory; and a second processor connected to the second memory. The first processor transmits the destination information to the positional information provision device in a case in which the mobile terminal is located at an interior of the vehicle, and the second processor optimizes a traveling route of the vehicle, based on the destination information received from the destination information retrieval device, and issues a notification of the optimized traveling route.

The destination information retrieval system of the seventh aspect can provide a recommended traveling route to an occupant at the timing a specific user having the mobile terminal rides in the vehicle.

According to the present disclosure, a recommended traveling route can be provided to an occupant in the vehicle, using the posted information in the SNS.

BRIEF DESCRIPTION OF THE DRAWINGS

Exemplary embodiments of the present disclosure will be described in detail based on the following figures, wherein:

FIG. 1 is a block diagram of the configuration of a destination information retrieval system according to a first and second embodiments;

FIG. 2A is a block diagram of the configuration of a center server according to the first and second embodiments;

FIG. 2B is a block diagram of the hardware configuration of the center sever;

FIG. 3A illustrates an exemplary preference table according to an embodiment;

FIG. 3B illustrates an exemplary preference table according to an embodiment;

FIG. 3C illustrates an exemplary preference table according to an embodiment;

FIG. 3D illustrates an exemplary preference table according to an embodiment;

FIG. 4A illustrates an exemplary destination table according to an embodiment;

FIG. 4B illustrates an exemplary destination table according to an embodiment;

DETAILED DESCRIPTION

First Embodiment

Figure 5A:
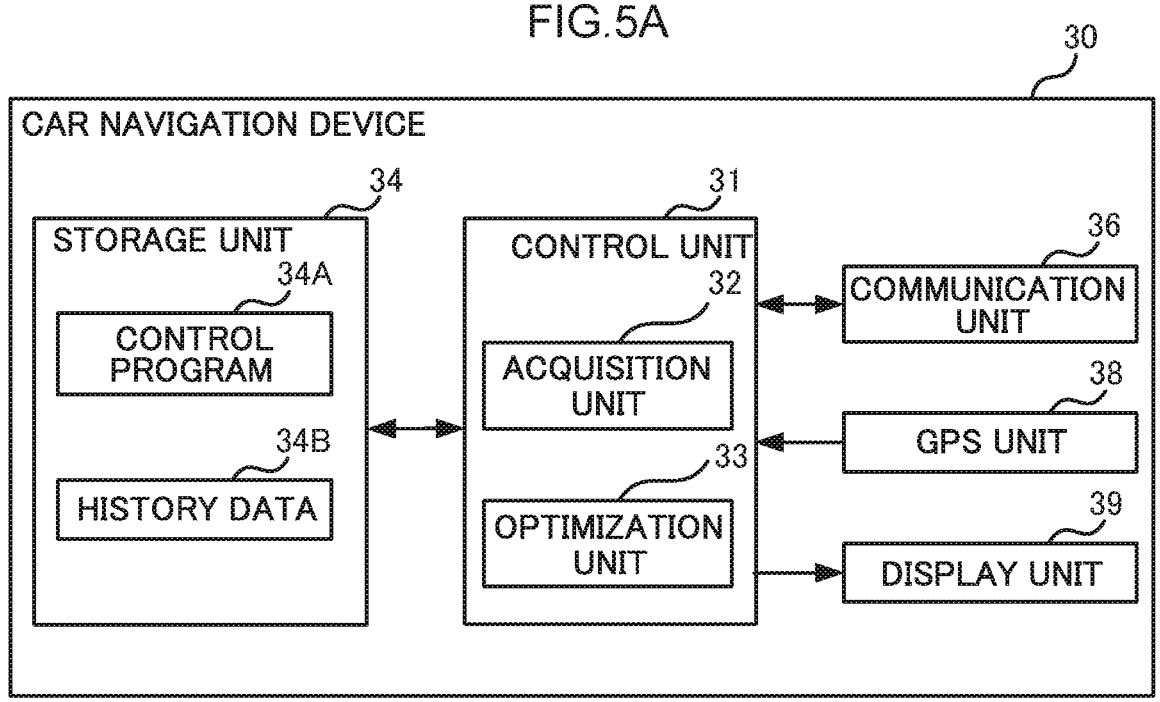
FIG. 5A is a block diagram of the configuration of a car navigation device according to the first and second embodiments.

A destination information retrieval device and a destination information retrieval system of one embodiment of the present disclosure, will be described below with reference to the drawings. FIG. 1 is a block diagram of the schematic configuration of the destination information retrieval system 10 according to the present embodiment.

(Configuration)

As illustrated in FIG. 1, the destination information retrieval system 10 according to the present embodiment includes a center server 20, a car navigation device 30, an SNS server 40, and a mobile terminal 50. The car navigation device 30 of the present embodiment is mounted on a vehicle 12 in which a user who uses an SNS rides. This SNS is managed by the SNS server 40. In the following descriptions, an occupant who rides in the vehicle 12 is defined as a "specific user" among users who use the SNS, and the user is distinguished from the other users who use the SNS. The center server 20, the car navigation device 30, the SNS server 40, and the mobile terminal 50 are mutually connected via a network N1.

As illustrated in FIG. 2A, the center server 20 includes a control unit 21, a storage unit 27, and a communication unit 28. The center server 20 of the present embodiment performs destination information retrieval processing. Specifically, the center server 20 individually acquires posted information of a user who uses the SNS from the SNS server 40 and the positional information regarding the vehicle 12 from the car navigation device 30, and determines the destination of the vehicle 12 on the basis of the acquired information. The center server 20 outputs the determined destination as destination information, to the car navigation device 30 (see FIG. 1). In the present embodiment, the center server 20 corresponds to the destination information retrieval device.

As illustrated in FIG. 2B, the control unit 21 includes, for example, a central processing unit (CPU) 21A, a read only memory (ROM) 21B, and a random access memory (RAM) 21C. The CPU 21A, the ROM 21B, the RAM 21C, the storage unit 27, and the communication unit 28 are mutually and communicatively connected via a bus 29. The CPU 21A corresponds to a first processor, and the RAM 21C corresponds to a first memory. In the control unit 21, the CPU 21A reads an execution program 27A to be described later from the storage unit 27 and executes the execution program 27A using the RAM 21C as a work area. This arrangement allows the CPU 21A to function as an acquisition unit 22, an analysis unit 23, a determination unit 24, a setting unit 25, and an output unit 26 in the control unit 21.

As illustrated in FIG. 2A, the acquisition unit 22 has a function of individually acquiring, via the communication unit 28, the posted information according to a post by a user who uses the SNS, from the SNS server 40, and the positional information regarding the vehicle 12 from the car navigation device 30. The "posted information" includes, for example, text information including text data, image information including still image and moving image data, and sound information including sound data. The "posted information" may include comments about or evaluations of the post by the specific user. The acquisition unit 22 can acquire the posted information according to posts by users who use the SNS, the users including the specific user.

The analysis unit 23 has a function of analyzing the preferences of the specific user on the basis of the posted information of the specific user acquired by the acquisition unit 22. The "preferences" include predilections, hobbies, and concerns. This analysis unit 23 analyzes frequency of appearance for each genre from the posted information of the specific user, and converts the frequency of appearance into a score. For example, in a case in which the post by the specific user includes a number of photographs of cake or coffee, the score is updated to increase the ratio of the genre of cafes. In a case in which the post by the specific user includes a number of editorial comments on paintings, the score is updated to increase the ratio of the genre of art galleries. The update of a score is not limited to a post directly connected to a genre and thus may be performed for posts that simply suggest a specific genre. In a case in which there are a number of posts about, for example, being "tired" or a "desire to relax", the score may be updated to increase the ratio of the genre of hot springs. In a case in which there are a number of photographs of children, the score may be updated to increase the ratio of the genre of theme parks.

The analysis unit 23 can analyze the posted information of a user other than the specific user. For example, all users who use the SNS, a user related to the specific user, or a user in a group to which the specific user belongs, can be included in the scope of analysis. This arrangement enables the analysis unit 23 to convert the overall preferences of the users included in the scope of analysis—namely, a trend-into a score. Then, the score for each genre is stored into a preference table 27C, which is described below.

The determination unit 24 has a function of determining the destination of the vehicle 12, on the basis of the posted information and the current positional information regarding the vehicle 12 acquired by the acquisition unit 22, namely, a retrieval function. The determination unit 24 first determines, as destination candidates, spots located in a predetermined area, from a spot list previously stored in spot list data 27D of the storage unit 27 or a spot list acquired via the network N1. The predetermined area includes the area within a certain distance, centering on the current position of the vehicle 12, and the area between the current position of the vehicle 12 and a previously set destination.

Then, the determination unit 24 determines a destination from the destination candidates in the predetermined area in consideration of the scores in preference stored in the preference table 27C.

The determination unit 24 may determine a plurality of destinations instead of one destination. In this case, the determination unit 24 determines the order of stopping off at the destinations. The order of stopping off is not necessarily the order of increasing distance from the current position of the vehicle 12. For example, the order of stopping off can be determined as meeting post content in the SNS or the behavior of a user, such as the order of a sport facility and a hot spring facility or the order of a shopping mall and a restaurant. Then, the determination unit 24 generates the positional information having the order of stopping off added to the destinations.

The setting unit 25 has a function of setting the preference of the specific user. This setting unit 25 can set weighting to each genre, on the basis of setting of the specific user, separately from the weighting of the analysis unit 23 to each genre in preference. That is, the setting unit 25 is capable of changing the scores in preference, independently of the analysis unit 23. This arrangement enables the preference of the specific user according to a genre that has not been posted on the SNS, to be reflected onto the destination.

The setting unit 25 can set a genre to be preferentially determined as the destination. This arrangement allows the determination unit 24 to determine, for example, in traveling for a meal, a destination included in the genres of meals. For example, in evacuation from a disaster, the determination unit 24 determines a destination included in the genres of disasters.

The output unit 26 has a function of outputting, as the destination information, the destination determined by the determination unit 24. In a case in which the destination includes a plurality of destinations, the output unit 26 outputs the destination information to which the order of stopping off has been added. This destination information output from the output unit 26 is transmitted from the communication unit 28 to the car navigation device 30. The destination information can be transmitted from the communication unit 28 to the SNS server 40 and the mobile terminal 50.

A non-transitory storage medium, such as a hard disk drive (HDD), a solid state drive (SSD), or a flash memory, is used as the storage unit 27. The storage unit 27 of the present embodiment stores the execution program 27A for performing various types of processing in the center server 20. The storage unit 27 stores an ID information table 27B, the preference table 27C, the spot list data 27D, and destination data 27E. The ID information table 27B stores, for example, an account and a password necessary for browsing the post by the specific user in the SNS server 40, a terminal unique ID for specifying the car navigation device 30, and a terminal unique ID for specifying the mobile terminal 50.

The preference table 27C prescribes a score in preference for each genre in each category. FIGS. 3A to 3D are examples of the preference table 27C. As illustrated in FIG. 3A, the preference table 27C having the category of meals prescribes the scores of "Japanese foods", "Western foods", "Chinese foods", "cafes", and the like in the genres of meals. As illustrated in FIG. 3B, the preference table 27C having the category of activities prescribes the scores of "sport", "theme parks", "art galleries and museums", "shopping", and the like in the genres of activities. As illustrated in FIG. 3C, the preference table 27C having the category of drives and travel prescribes the scores of "sea and mountains", "hot springs", "gourmets", "noted places", and the like in the genres of drives and travel. As illustrated in FIG. 3D, the preference table 27C having the category of disasters prescribes the scores of "foodstuffs", "bathing", "power sources", "diapers", and the like in the genres of evacuation sites in disasters.

The spot list data 27D stores, as a spot list, a spot to be retrieved on a map together with the attribute of the spot. The attribute includes information indicating an overview of the spot, such as a restaurant, an amusement park, or a sightseeing spot. The spot list may be previously installed in the storage unit 27 or may be acquired via the network N1. In a case in which the spot list has been previously installed in the storage unit 27, the spot list can be updated via the network N1.

The destination data 27E stores the order of stopping off and the destinations. This destination data 27E can store data determined in the past in addition to a destination newly determined by the determination unit 24. For example, FIG. 4A is an exemplary retrieved result for drives. As illustrated in FIG. 4A, the destination data 27E prescribes destinations in the order of "A mountain ropeway", "restaurant B", "C coast", and "one-day hot spring D". FIG. 4B is an exemplary retrieved result for meals. As illustrated in FIG. 4B, the destination data 27E prescribes destinations in the order of "Italian restaurant E", "cafe F", and "G patisserie".

As illustrated in FIG. 2A, the communication unit 28 that is a communication interface, is connected to the network N1 (see FIG. 1). This communication unit 28 has a function of communicating with each of the SNS server 40, the car navigation device 30, and the mobile terminal 50. For example, the Internet or a wide area network (WAN) is applied as the network N1.

As illustrated in FIG. 5A, the car navigation device 30 that serves as a positional information provision device, includes a control unit 31, a storage unit 34, a communication unit 36, a GPS unit 38, and a display unit 39. This car navigation device 30 provides the position of the vehicle 12 with the car navigation device 30 mounted. The car navigation device 30 determines a traveling route for the vehicle 12, on the basis of the destination information received from the center server 20, and issues a notification of the determined traveling route.

Figure 5B:
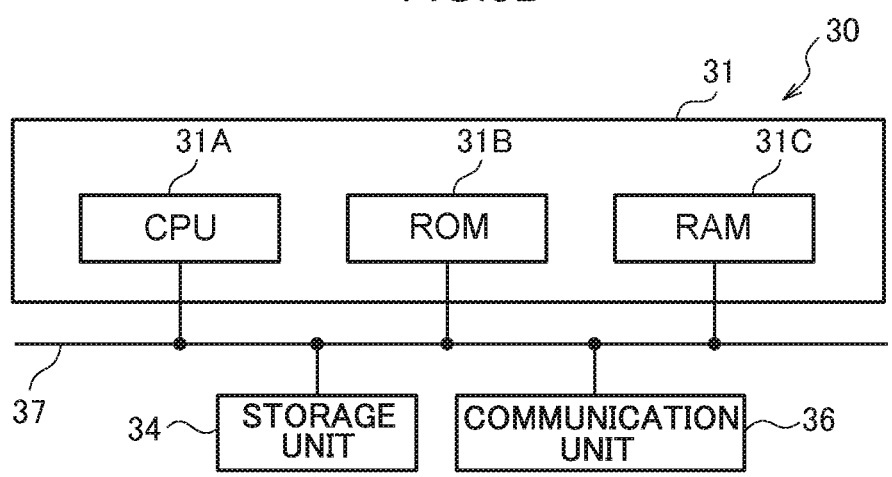
FIG. 5B is a block diagram of the hardware configuration of the car navigation device.

As illustrated in FIG. 5B, the control unit 31 includes, for example, a central processing unit (CPU) 31A, a read only memory (ROM) 31B, and a random access memory (RAM) 31C. The CPU 31A, the ROM 31B, the RAM 31C, the storage unit 34, and the communication unit 36 are mutually and communicatively connected via a bus 37. The CPU 31A corresponds to a second processor, and the RAM 31C corresponds to a second memory. In the control unit 31, the CPU 31A reads a control program 34A to be described later from the storage unit 34 and executes the control program 34A using the RAM 31C as a work area. This arrangement allows the CPU 31A to function as an acquisition unit 32 and an optimization unit 33 in the control unit 31.

As illustrated in FIG. 5A, the acquisition unit 32 has a function of acquiring the destination information from the center server 20 via the communication unit 36.

The optimization unit 33 has a function of optimizing the traveling route of the vehicle 12, on the basis of the destination information acquired by the acquisition unit 32. The optimization of the traveling route can not only simply set a traveling route to a destination included in the destination information, but also set the destination included in the destination information as a stop-off destination to the previously set destination. The optimization unit 33 acquires congestion information from publicly known vehicle information and communication system (VICS (registered trademark)) and then can reflect the congestion information onto setting of the traveling route.

A non-transitory storage medium, such as a hard disk drive (HDD), a solid state drive (SSD), or a flash memory, is used as the storage unit 34. The storage unit 34 of the present embodiment stores the control program 34A for performing various types of processing in the car navigation device 30. The storage unit 34 stores history data 34B. The history data 34B stores a destination history in the traveling of the vehicle 12 based on the destination information provided from the center server 20.

The communication unit 36 that is a communication interface, is connected to the network N1 (see FIG. 1). This communication unit 36 has a function of communicating with the center server 20. That is, the communication unit 36 receives the destination information transmitted from the communication unit 28 of the center server 20.

The GPS unit 38 has a function of measuring the current positional coordinates of the vehicle 12 with the car navigation device 30 mounted, on the basis of a radio wave from a global positioning system (GPS) satellite. That is, the car navigation device 30 allows the positional coordinates measured by the GPS unit 38 to be positional information.

The display unit 39 includes a touch-panel liquid-crystal display provided on the center console or the dashboard of the vehicle 12. The display unit 39 may be formed integrally with or separately from the main body of the car navigation device 30. This display unit 39 has a function of displaying the current position and the traveling route of the vehicle 12. The display unit 39 of the present embodiment corresponds to a notification unit.

The SNS server 40 of the present embodiment has a function as a management server that manages the SNS. As illustrated in FIG. 1, the SNS server 40 is connected to the center server 20 and the mobile terminal 50 via the network N1. The SNS server 40 renders the posted information of the specific user transmitted from, for example, the mobile terminal 50, available for transmission (namely, uploading), so that another terminal connected to the SNS server 40 can receive the posted information (namely, downloading). This SNS server 40 can restrict browsing in order to allow only a user specified by the specific user to browse the posts of the specific user.

The mobile terminal 50 includes a smartphone or a tablet terminal possessed by the specific user who uses the SNS. This mobile terminal 50 is connected to the center server 20 and the SNS server 40 via the network N1. The specific user who uses the destination information retrieval system 10 of the present embodiment, can make a post on the SNS from the mobile terminal 50.

(Flow of Processing)

Next, the flow of processing in the destination information retrieval system 10 of the present embodiment, will be described with reference to the sequence diagram of FIG. 6.

First, the processing according to user registration to be made in advance in the center server 20 by the specific user who uses the SNS and retrieves a destination on the basis of the posted information in the SNS, will be described.

Figure 6:
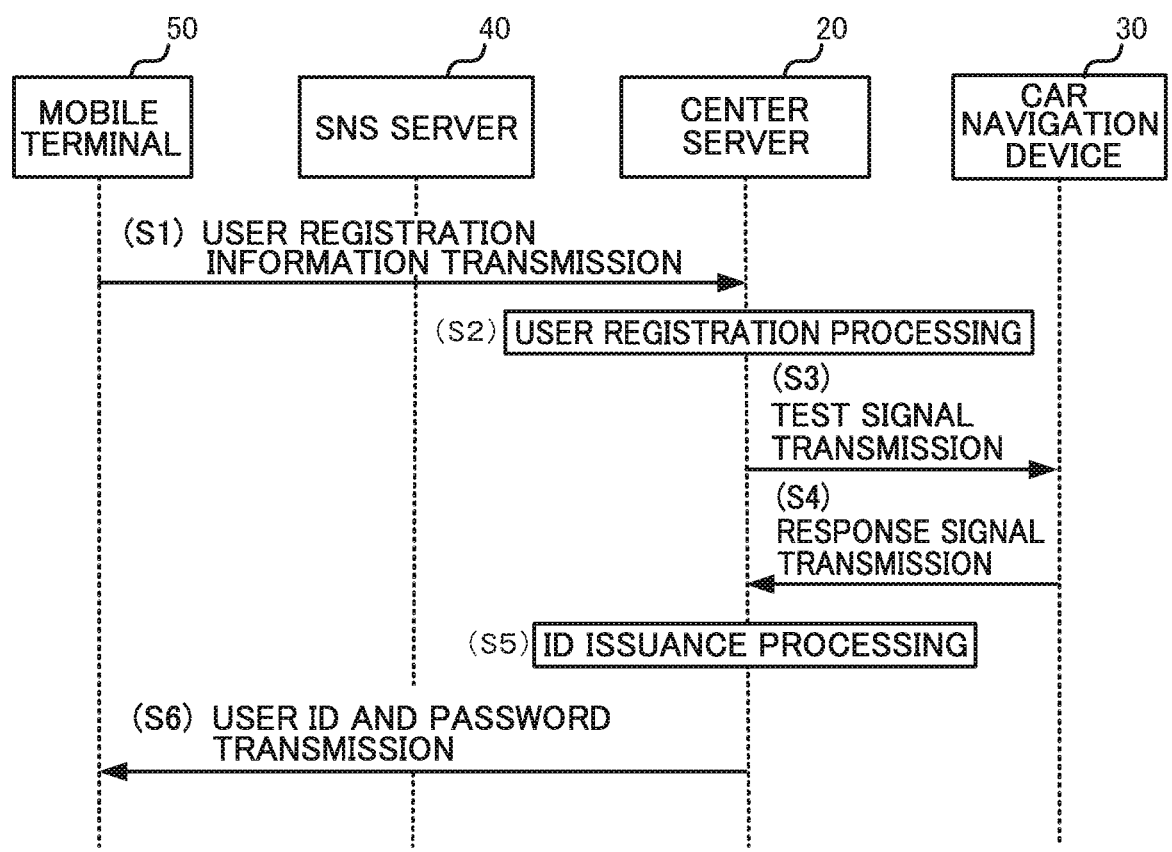
FIG. 6 is a sequence diagram of the flow of processing according to user registration in the destination information retrieval system according to the first embodiment.

At step S1 of FIG. 6, the mobile terminal 50 transmits user registration information input into the mobile terminal 50, to the center server 20. The user registration information that includes information input from an input device of the mobile terminal 50, is transmitted to the center server 20 through an application previously installed on the mobile terminal 50 or a dedicated Internet site. This user registration information includes, for example, the account and the password necessary for browsing the post by the specific user in the SNS server 40, information for specifying the car navigation device 30 (for example, the terminal unique ID), and information for specifying the mobile terminal 50 (for example, the terminal unique ID).

Information according to a genre or a category to be preferentially determined as the preference and the destination of the specific user, can be registered as the user registration information. Registration and alteration of the information according to the genre or the category in the preference, can be made after the user registration.

At step S2, the center server 20 performs user registration processing, on the basis of the user registration information acquired from the mobile terminal 50. Specifically, the setting unit 25 generates a unique user ID and additionally writes the generated user ID and the acquired user registration information into a new area of the ID information table 27B.

At step S3, the center server 20 transmits a test signal to the car navigation device 30 corresponding to a terminal unique ID included in the user registration information.

At step S4, in a case in which the car navigation device 30 receives the test signal correctly, the car navigation device 30 transmits a response signal to the center server 20.

At step S5, in a case in which the center server 20 receives the response signal correctly, the center server 20 performs ID issue processing. Specifically, the user ID for user notification and a password generated simultaneously with the ID, are acquired from the ID information table 27B.

At step S6, the center server 20 transmits the user ID generated in the user registration processing and the password generated simultaneously therewith, to the mobile terminal 50.

Next, the processing according to route optimization in retrieving a destination on the basis of the post by the specific user in the SNS, will be described with reference to the sequence diagram of FIG. 7.

Figure 7:
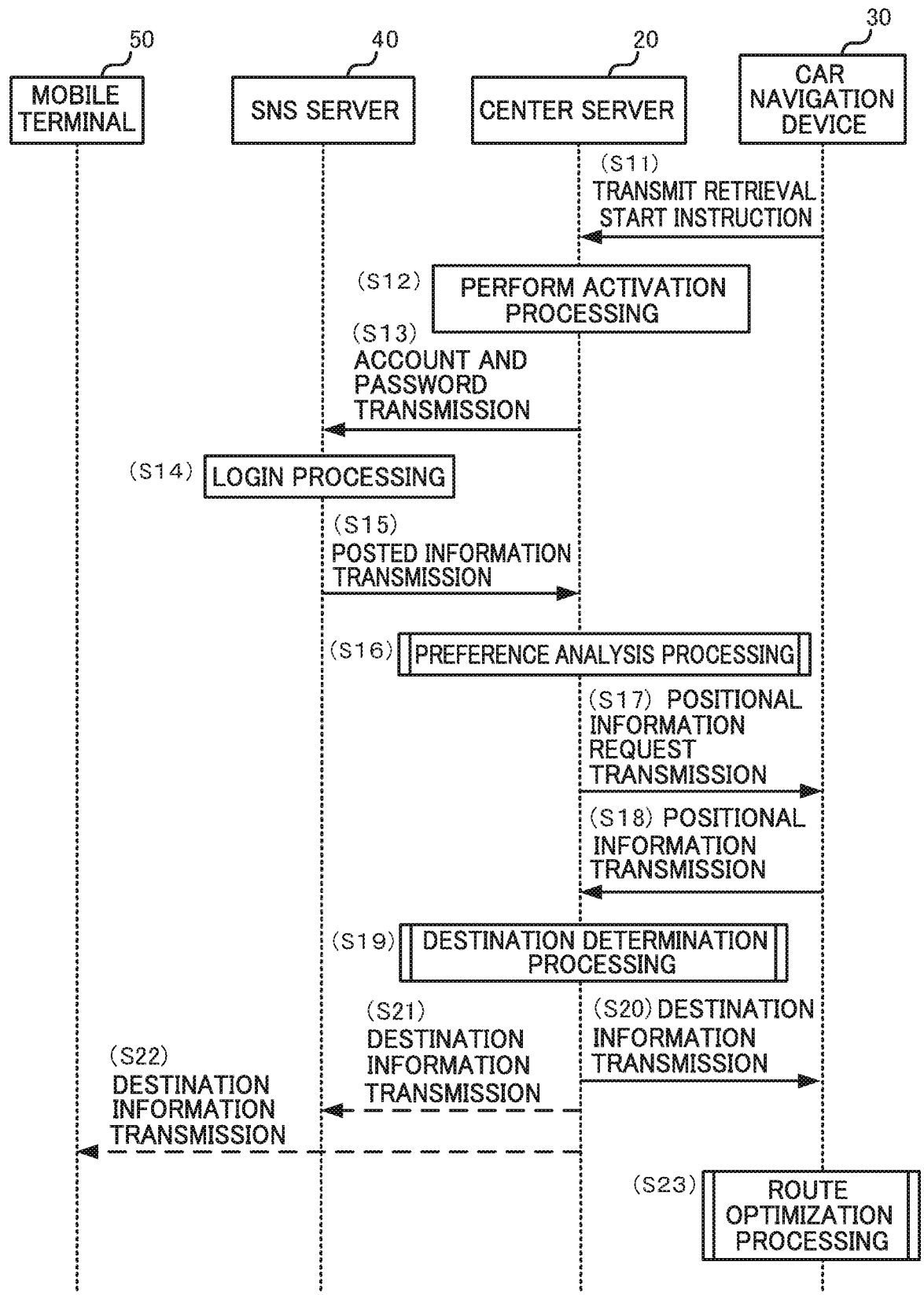
FIG. 7 is a sequence diagram of the flow of processing according to route optimization in the destination information retrieval system according to the first embodiment.

At step S11 of FIG. 7, the car navigation device 30 transmits a retrieval start instruction to the center server 20, on the basis of a predetermined operation of the specific user. The retrieval start instruction may be transmitted from the mobile terminal 50.

At step S12, the center server 20 that has received the retrieval start instruction, performs activation processing. Specifically, the control unit 21 of the center server 20 acquires the account and the password of the SNS server 40 corresponding to the user ID, with reference to the ID information table 27B.

At step S13, the center server 20 transmits the account and the password from the communication unit 28 to the SNS server 40.

At step S14, the SNS server 40 performs log-in processing using the account and the password received from the center server 20. Agreement between the account and the password in the SNS server 40, enables the center server 20 to browse the post by the specific user (namely downloading).

At step S15, the SNS server 40 transmits the posted information to the center server 20. That is, the post in the SNS is downloaded.

At step S16, the analysis unit 23 of the center server 20 performs preference analysis processing. The details thereof will be described later. Performing of the preference analysis processing causes the preference of the specific user to be converted into a score. Then, the analysis unit 23 updates the preference table 27C, on the basis of the newly converted score. In a case in which the setting unit 25 has set the preference of the specific user, the score in preference based on the setting is also reflected onto the preference table 27C.

At step S17, the center server 20 transmits a positional information request from the communication unit 28 to the car navigation device 30. That is, the center server 20 requests the current position of the car navigation device 30.

At step S18, the car navigation device 30 that has received the positional information request, transmits the current position of the vehicle 12 as the positional information from the communication unit 36 to the center server 20.

At step S19, the determination unit 24 of the center server 20 determines at least one destination, on the basis of the preference table 27C and the acquired positional information (see FIGS. 4A and 4B). The details thereof will be described later.

At step S20, the center server 20 transmits the determined at least one destination as the destination information from the communication unit 28 to the car navigation device 30. The destination information may be transmitted to the SNS server 40 (step S21). In this case, the center server 20 can post the determined destination onto the SNS. The destination information may be transmitted to the mobile terminal 50 (step S22). In this case, the center server 20 can directly notify the specific user of the determined destination through the mobile terminal 50.

At step S23, the optimization unit 33 in the car navigation device 30 that has received the destination information, performs route optimization processing, on the basis of the destination information. The details thereof will be described later. The route optimization processing allows the destination information determined by the center server 20, to be displayed on the display unit 39 of the car navigation device 30.

Figure 8:
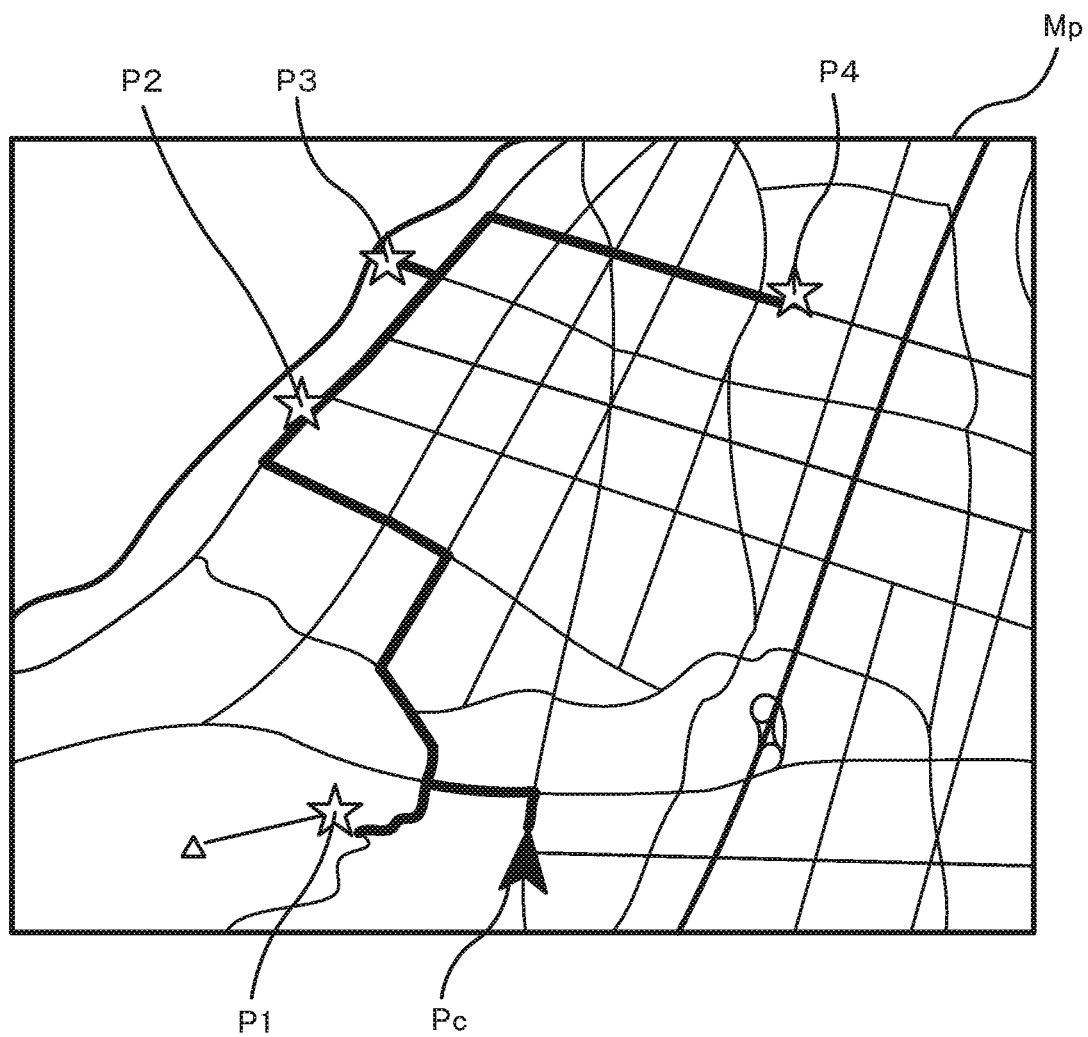
FIG. 8 is an exemplary display on a display unit of the car navigation device according to the first embodiment.

FIG. 8 is an exemplary display of the display unit 39 in the case of the route optimization processing performed on the basis of the destination data 27E of FIG. 4A. As illustrated in FIG. 8, the position Pc of the vehicle 12 and the plurality of destinations P1 to P4 are displayed on a map Mp. The destinations P1 to P4 correspond to the order of stopping off 1 to 4, respectively. Although FIG. 4A illustrates exemplary destinations for drives, the post content in the SNS can be reflected onto the traveling route of the vehicle 12, in the present embodiment.

Figure 9:
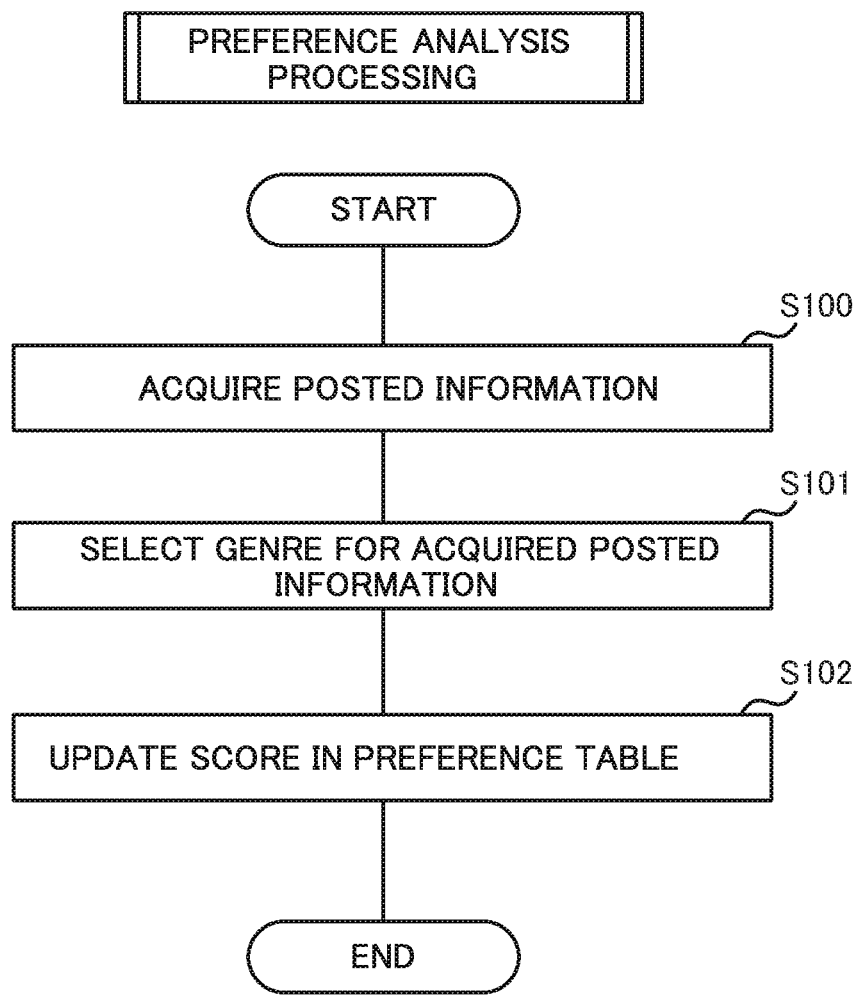
FIG. 9 is a flowchart of the flow of preference analysis processing according to the first embodiment.

Next, the preference analysis processing to be performed after the CPU 21A reads the execution program 27A in the center server 20, will be described with reference to FIG. 9.

At step S100, the acquisition unit 22 first acquires the post by the specific user, namely, the posted information thereof from the SNS server 40 via the communication unit 28. Examples of a post to be acquired that can be adopted include posts for a certain period (e.g., within 24 hours or within a week), a certain number of posts (for example, the last five posts), and a post to specific content or a user.

At the next step S101, the analysis unit 23 selects a genre for the acquired information. For example, in a case in which a post of "pasta has been eaten for lunch" is included, the genre of "Western foods" illustrated in FIG. 3A is selected. In this case, the number of posts to be selected is not limited one. For example, a photograph of an open-air bath surrounded by mountains is included, the genre of "sea and mountains" and the genre of "hot springs" illustrated in FIG. 3C are selected.

At the next step S102, the analysis unit 23 updates the scores in the preference table 27C. For example, in a case in which the genre of "Western foods" has been selected, the analysis unit 23 adds a certain number of points to the score of "Western foods" in the preference table 27C or adds a point in consideration of the ratio of articles of "Western foods" included in the post (see FIG. 3A). For example, in a case in which the genre of "sea and mountains" and the genre of "hot springs" have been selected, the analysis unit 23 changes the weighting of scores to the preference table 27C having the category of "drives and travel" such that the score of "sea and mountains" and the score of "hot springs" increase (see FIG. 3C). When the scores are updated, the preference analysis processing finishes.

Figure 10:
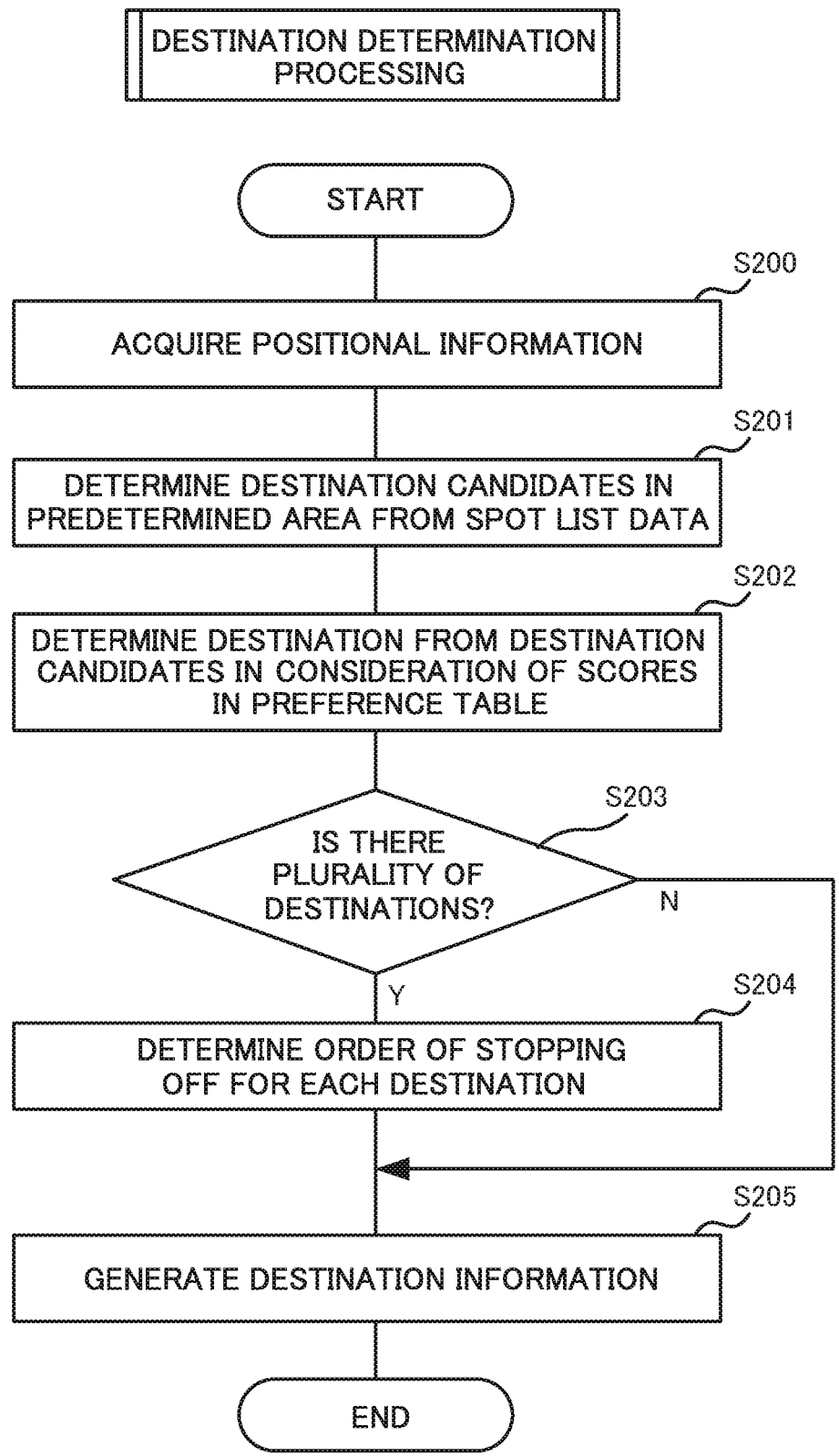
FIG. 10 is a flowchart of the flow of destination determination processing according to the first embodiment.

Next, destination determination processing to be performed after the CPU 21A reads the execution program 27A in the center server 20, will be described with reference to FIG. 10.

At step S200, the acquisition unit 22 first acquires the positional information according to the current position of the vehicle 12 from the car navigation device 30 via the communication unit 28.

At the next step S201, the determination unit 24 determines spots located in the predetermined area determined on the basis of the positional information regarding the vehicle 12, as destination candidates, from the spot list stored in the spot list data 27D. As described above, the predetermined area can include the area within the certain distance, centering on the current position of the vehicle 12 and the area between the current position of the vehicle 12 and the previously set destination. However, in a case in which the predetermined area is the area between the current position of the vehicle 12 and the previously set destination, the acquisition unit 22 acquires, at step S200, the current positional information regarding the vehicle 12 together with positional information according to the previously set destination.

At the next step S202, the determination unit 24 determines a destination from the destination candidates in consideration of the scores in the preference table 27C. For example, in a case in which the destination candidates include "sport facilities", "amusement parks", "art galleries", and "shopping malls", the determination unit 24 determines, as the destination, "amusement parks" corresponding to the genre of "theme parks" in consideration of the scores in the preference table 27C for activities illustrated in FIG. 3B.

At the next step S203, the determination unit 24 determines whether or not the destination determined at step S202 includes a plurality of destinations. In a case in which the destination includes the plurality of destinations, the processing proceeds to the next step S204. In a case in which the destination does not include the plurality of destinations, namely, in a case in which the destination includes only one destination, the processing proceeds to step S205.

At step S204, the determination unit 24 determines the order of stopping off to each destination. As described above, this order of stopping off is not necessarily the order of increasing distance from the current position of the vehicle 12. Thus, the order of stopping off can be determined in accordance with the behavior of the user. Even in a case in which the destination includes one destination, the order of stopping off may be determined. In this case, although the order of stopping off has only "1", step S203 is omitted.

At step S205, the determination unit 24 generates the positional information having the order of stopping off added to the destinations. Then, the destination determination processing finishes.

Figure 11:
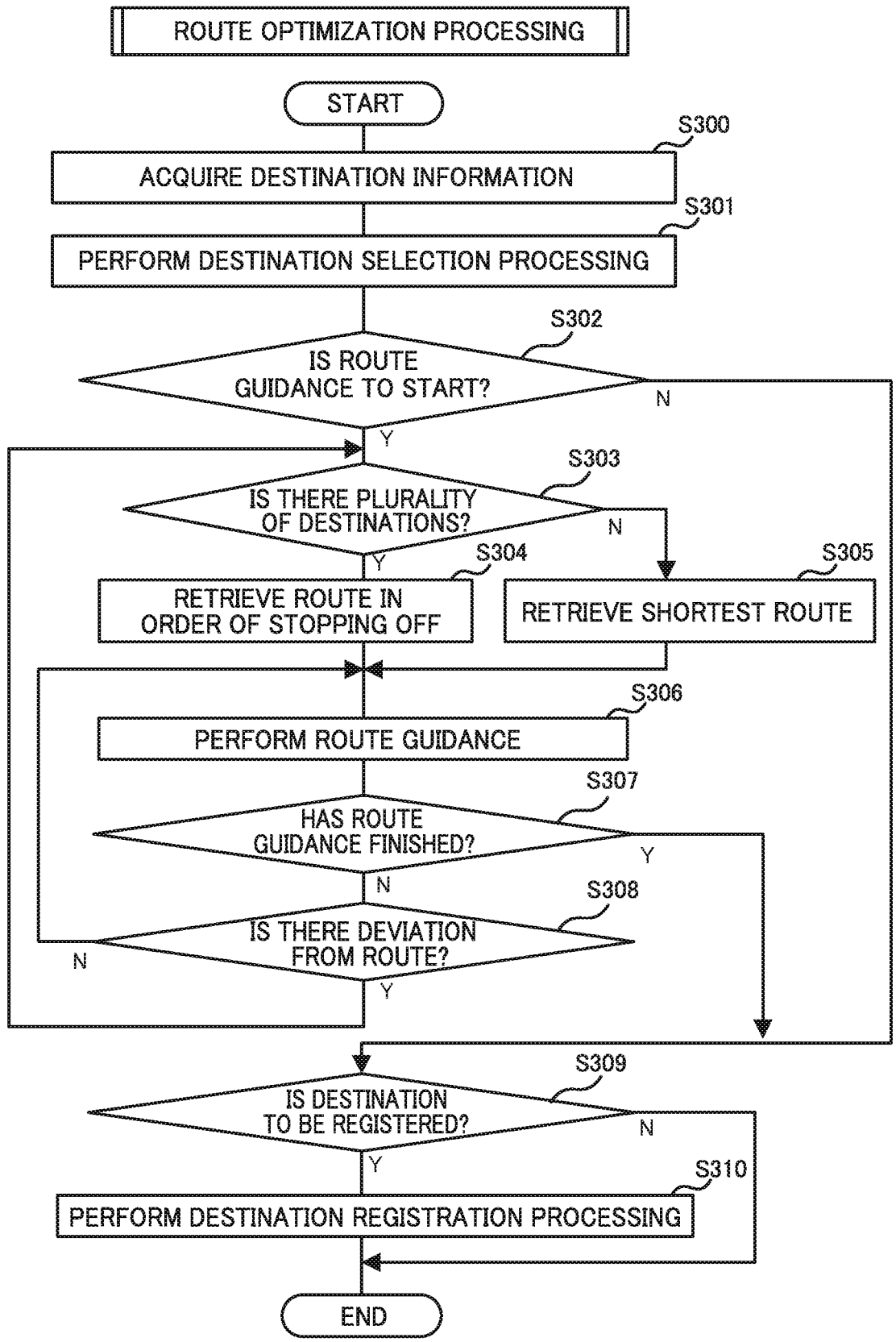
FIG. 11 is a flowchart of the flow of route optimization processing according to the first embodiment.

Next, the route optimization processing to be performed after the CPU 31A reads the control program 34A in the car navigation device 30, will be described with reference to FIG. 11.

At step S300, the acquisition unit 32 first acquires the positional information from the center server 20 via the communication unit 36.

At step S301, the optimization unit 33 performs destination selection processing. Specifically, the occupant selects whether or not the acquired destination is to be reflected onto the traveling route, on the display unit 39 that serves as the touch panel. Then, the optimization unit 33 performs the following processing, on the basis of the destination based on the selection.

At step S302, the optimization unit 33 determines whether or not route guidance is to start. An instruction of whether or not the route guidance is to start is issued on the basis of an operation of the occupant to the display unit 39 that serves as the touch panel. In a case in which the optimization unit 33 determines that the route guidance is to start, the processing proceeds to the next step S303. In a case in which the optimization unit 33 determines that the route guidance is not to start, the processing proceeds to step S309.

At step S303, the optimization unit 33 determines whether or not the destination selected at step S301 includes a plurality of destinations. In a case in which the optimization unit 33 determines that the destination includes the plurality of destinations, the processing proceeds to the next step S304. In a case in which the optimization unit 33 determines that the destination does not include the plurality of destinations, namely, includes one destination, the processing proceeds to step S305.

At step S304, the optimization unit 33 retrieves a route in the order of stopping off to the plurality of destinations. The order of stopping off is acquired together with the destinations from the destination information. Then, the processing proceeds to step S306.

At step S305, the optimization unit 33 retrieves the shortest traveling route to the one destination. Then, the processing proceeds to step S306.

At step S306, the control unit 31 performs the route guidance. That is, the occupant is notified of the current position of the vehicle 12 or the traveling route through the display unit 39 that serves as the notification unit or a speaker.

At the next step S307, the control unit 31 determines whether or not the route guidance has finished. Arrival at the terminal destination or reception of a guidance finish instruction through the display unit 39 that serves as the touch panel, allows the route guidance to finish. In a case in which the control unit 31 determines that the route guidance has finished, the processing proceeds to step S309. In a case in which the control unit 31 determines that the route guidance has not finished, the processing proceeds to the next step S308.

At step S308, the control unit 31 determines whether or not the current position of the vehicle 12 is deviating from the traveling route. In a case in which the control unit 31 determines the deviation from the traveling route, the processing goes back to step S303. This arrangement allows the optimization unit 33 to retrieve a route for an unarrived destination, again. In a case in which the control unit 31 determines no deviation from the traveling route, the processing goes back to step S306. That is, the control unit 31 continues the route guidance.

Step S309 is intended for a case in which the route guidance has not been performed and a case in which the route guidance has finished. At step S309, the control unit 31 determines whether or not the destination is to be registered. An instruction for registration of the destination, is issued on the basis of an operation of the occupant to the display unit 39 that serves as the touch panel. In a case in which the control unit 31 determines that the destination is to be registered, the processing proceeds to step S310. In a case where the control unit 31 determines that the destination is not to be registered, the route optimization processing finishes.

At step S310, the control unit 31 performs destination registration processing. That is, the control unit 31 saves the destination to be registered, into the history data 34B. Then, the route optimization processing finishes.

(Summary)

As described above, the destination information retrieval system 10 and the center server 20 of the present embodiment can provide a recommended traveling route to the occupant of the vehicle 12, using the posted information in the SNS and the current positional information regarding the vehicle 12. In the present embodiment, the analysis unit 23 assigns scores to preferences from posts by the specific user, so that the preferences of the specific user can be reflected in the traveling route when the specific user is riding in the vehicle 12. The present embodiment is favorable even in the case of evacuation from a disaster in the vehicle 12. That is, analysis of, for example, currently necessary goods, services, or volunteer information from posts in the SNS, can be reflected in an evacuation route. For example, as illustrated in FIG. 3D, the provision of the preference table 27C having the category of disasters enables an evacuation site having "diapers" included in relief goods, to be set as a traveling route after the specific user posts a photograph of an infant on the SNS.

In a case in which the center server 20 determines a plurality of destinations, addition of the order of stopping off enables a recommended order of stopping off, to be set for the plurality of destinations. As described above, this order of stopping off is not necessarily the order of increasing distance from the current position of the vehicle 12. Thus, the order of stopping off can be determined as meeting the post content in the SNS or the behavior of the user, such as the order of a sport facility and a hot spring facility or the order of a shopping mall and a restaurant.

In the present embodiment, the setting unit 25 can reflect the preference of the specific user onto the traveling route in advance. This arrangement enables the preference of the specific user according to a genre that has not been posted on the SNS, to be reflected onto the destination.

Second Embodiment

The destination information retrieval system 10 of the first embodiment determines a destination on the basis of the posted information of the specific user already stored in the SNS server 40, and reflects the destination onto the traveling route. In contrast to this, a destination information retrieval system 10 of a second embodiment determines a recommended destination, on the basis of posted information of a user different from a specific user stored in an SNS server 40.

The flow of processing according to route optimization in the destination information retrieval system 10 of the present embodiment, will be described with reference to the sequence diagram of FIG. 12. The configuration of the destination information retrieval system 10 of the second embodiment is the same as that of the first embodiment, and thus the description thereof will be omitted.

Figure 12:
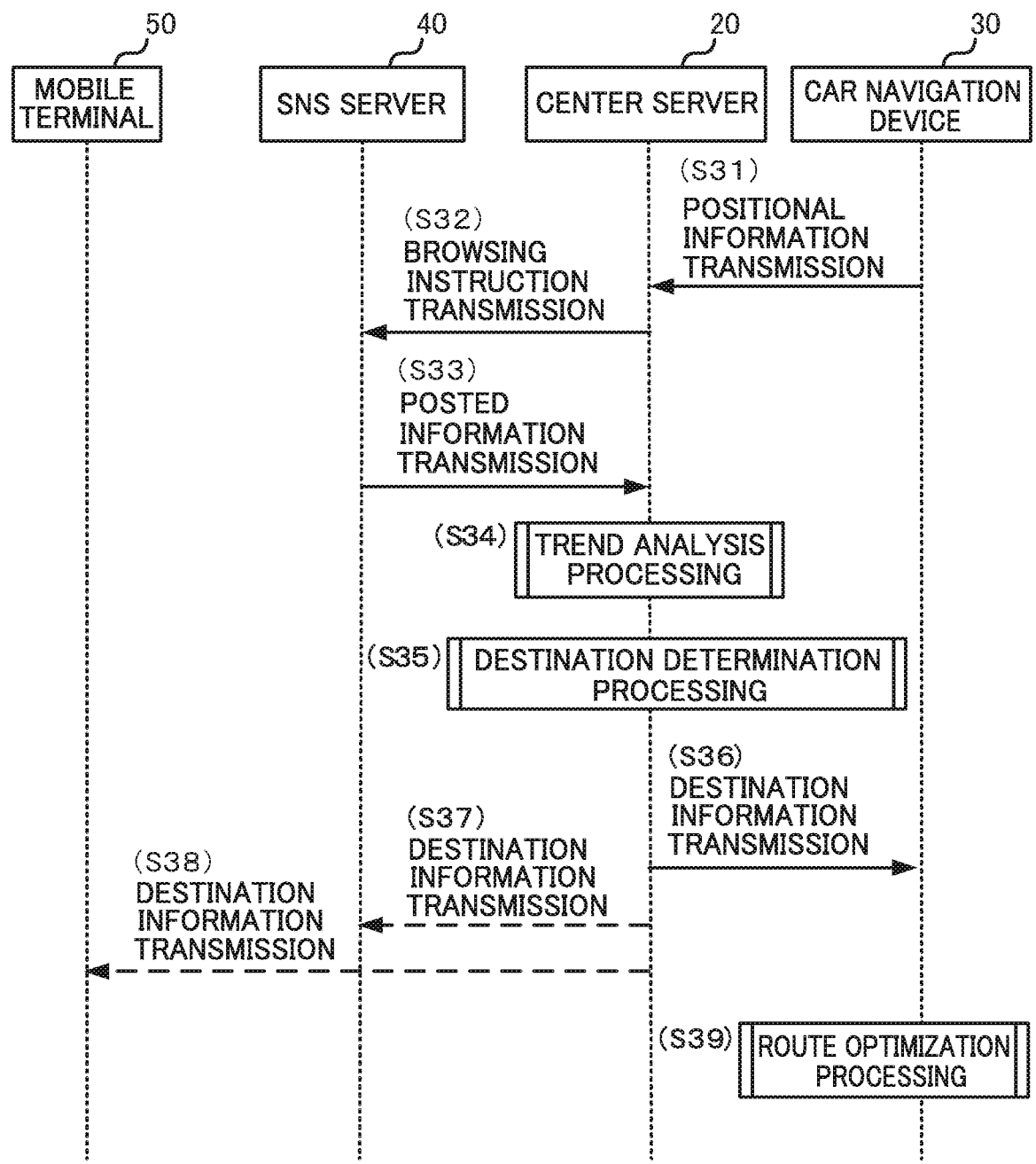
FIG. 12 is a sequence diagram of the flow of processing according to route optimization in the destination information retrieval system according to the second embodiment.

At step S31 of FIG. 12, a car navigation device 30 transmits the current position of a vehicle 12 as positional information from a communication unit 36 to a center server 20, on the basis of a predetermined operation of the specific user. This arrangement allows an acquisition unit 22 of the center server 20 to acquire the positional information.

At step S32, the center server 20 transmits a browsing instruction from a communication unit 28 to the SNS server 40. That is, the center server 20 accesses a predetermined page on an SNS. In a case in which the center server 20 determines a destination on the basis of, for example, a user related to the specific user or a user in a group to which the specific user belongs, the center server 20 transmits the account and the password of the specific user from the communication unit 28 to the SNS server 40.

At step S33, the SNS server 40 transmits posted information to the center server 20. This arrangement allows the acquisition unit 22 of the center server 20 to acquire the posted information, namely, to download the post in the SNS. In the case in which the center server 20 determines a destination on the basis of, for example, a user related to the specific user or a user in a group to which the specific user belongs, performing log-in processing using the account and the password received from the center server 20 enables the post to be downloaded.

Repetition of steps S32 and S33 enables the preferences of a larger number of users to be reflected onto the traveling route.

At step S34, an analysis unit 23 of the center server 20 performs trend analysis processing, on the basis of the posted information acquired by the acquisition unit 22. The details thereof will be described later.

The processing from step S35 to step S39 of FIG. 12 is similar to the processing from step S19 to step S23 of FIG. 7, and thus the description thereof will be omitted.

Figure 13:
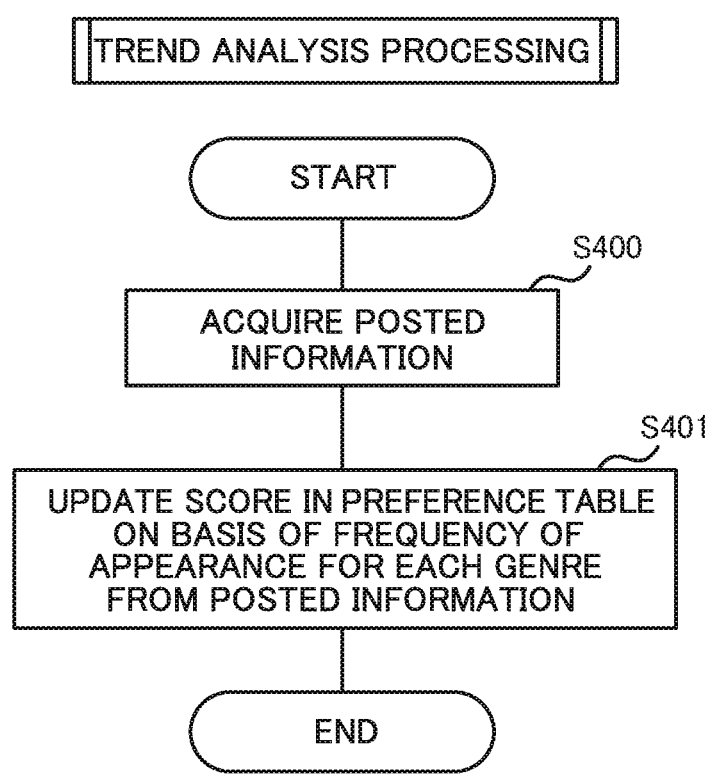
FIG. 13 is a flowchart of the flow of trend analysis processing according to the second embodiment.

Next, the trend analysis processing to be performed after a CPU 21A reads an execution program 27A in the center server 20, will be described with reference to FIG. 13.

At step S400, the acquisition unit 22 first acquires the posted information in the SNS from the SNS server 40 via the communication unit 28.

At the next step S401, the analysis unit 23 updates a score in a preference table 27C, on the basis of the frequency of appearance for each genre in the posted information. For example, in a case in which a number of posts having topics on pandas are included, weighting is changed such that the score of "zoos" increases. When the score is updated, the trend analysis processing finishes.

As described above, the destination information retrieval system 10 and the center server 20 of the present embodiment can obtain an effect similar to that of the first embodiment. Particularly, in the present embodiment, the analysis unit 23 scores a trend in the post in the SNS, so that the trend in the world can be reflected onto the traveling route after the specific user rides in the vehicle 12.

Third Embodiment

In the destination information retrieval system 10 of the first and second embodiments, the center server 20 acquires the post in the SNS and determines a destination, and the car navigation device 30 performs the route guidance on the basis of the determined destination. In contrast to this, in a destination information retrieval system 100 of a third embodiment, a car navigation device 130 acquires a post in an SNS and performs all of preference analysis processing, destination determination processing, and route optimization processing. In the present embodiment, the car navigation device 130 corresponds to a destination information retrieval device and a positional information provision device.

Figure 14:
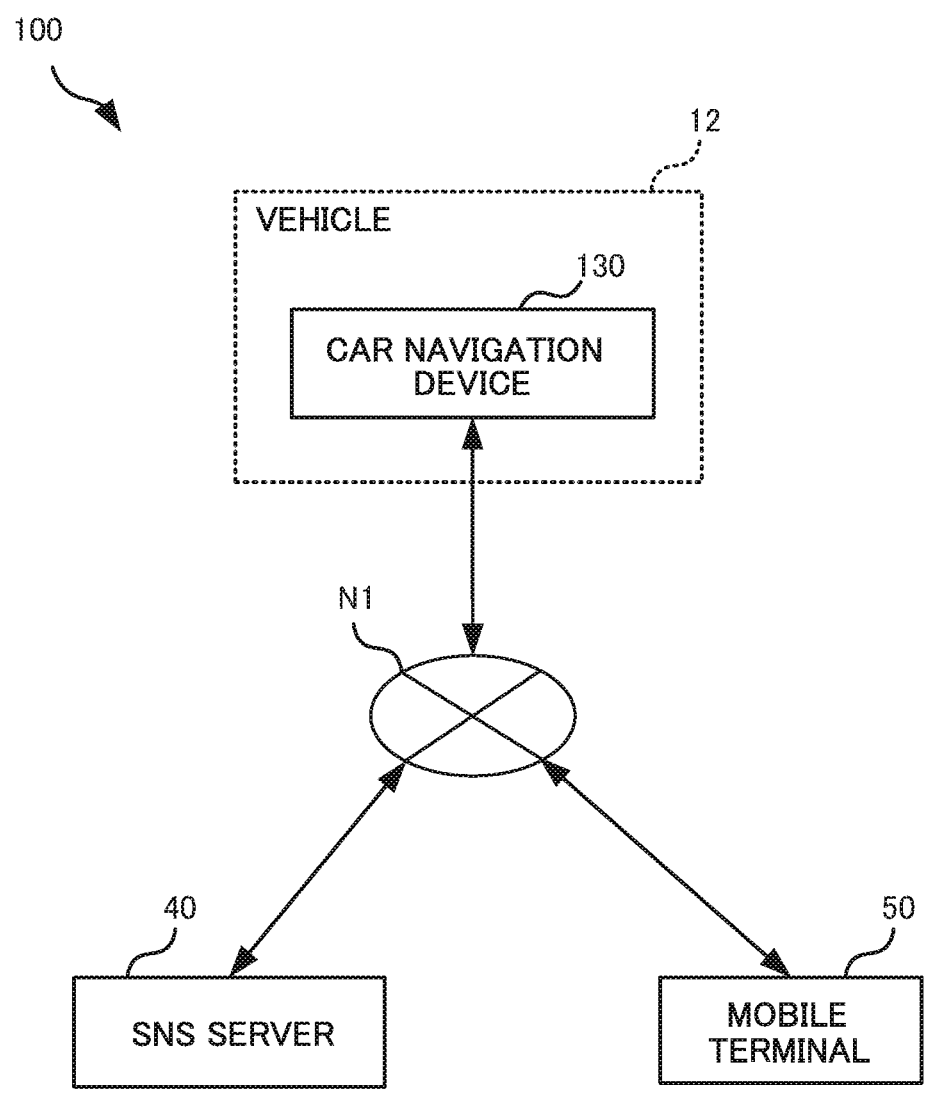
FIG. 14 is a block diagram of the configuration of a destination information retrieval system according to a third embodiment.

As illustrated in FIG. 14, the destination information retrieval system 100 according to the present embodiment includes an SNS server 40, a mobile terminal 50, and the car navigation device 130. The car navigation device 130 of the present embodiment is mounted on a vehicle 12 in which a user who uses the SNS rides. This SNS is managed by the SNS server 40. The car navigation device 130, the SNS server 40, and the mobile terminal 50 are mutually connected via a network N1. Differences from the first and second embodiments will be described below. The same constituents as in the first and second embodiments, are denoted with the same reference signs, and thus the duplicate descriptions thereof will be omitted.

Figure 15:
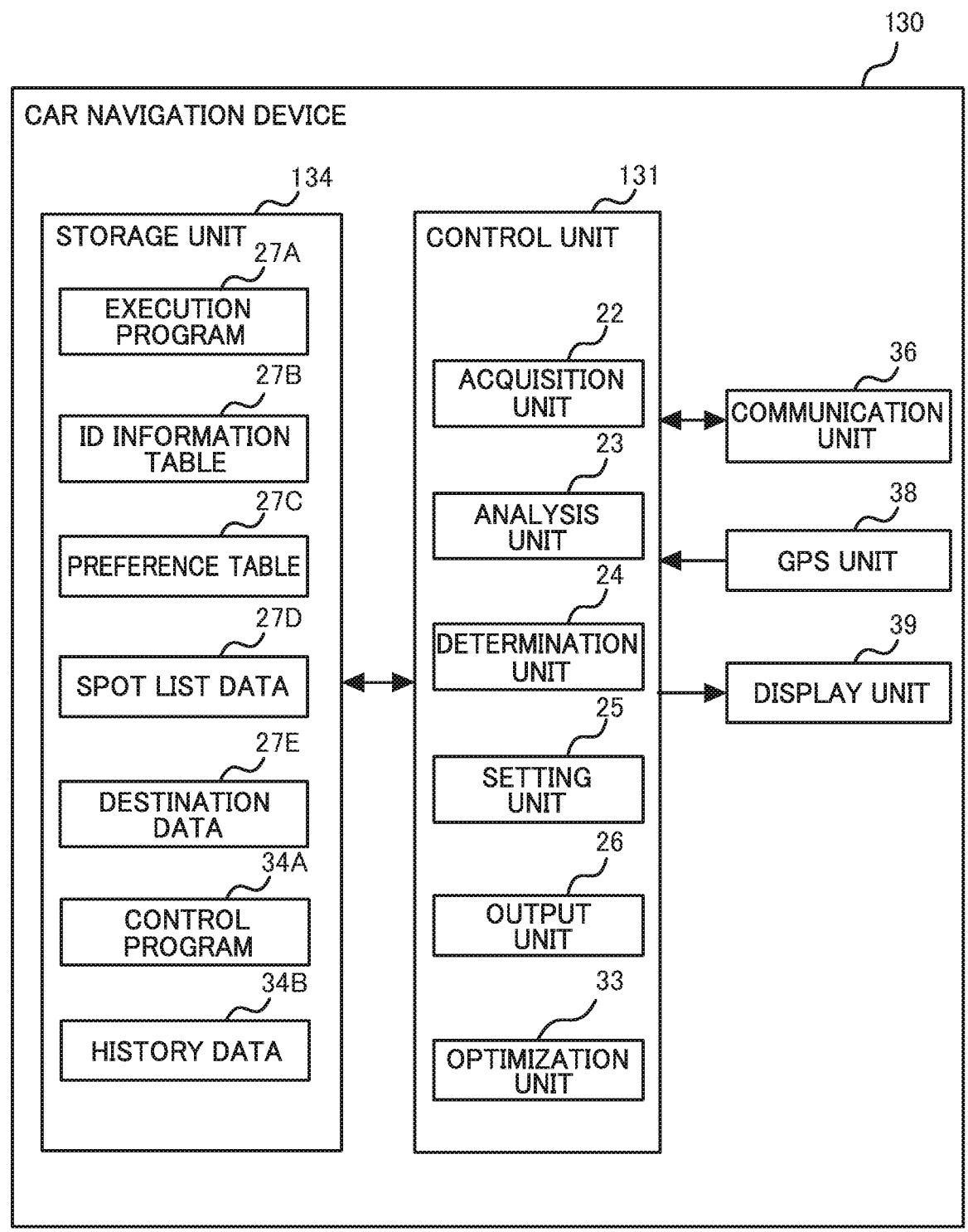
FIG. 15 is a block diagram of the configuration of a car navigation device according to the third embodiment.

As illustrated in FIG. 15, the car navigation device 130 includes a control unit 131, a storage unit 134, a communication unit 36, a GPS unit 38, and a display unit 39.

A CPU executes an execution program 27A, so that the control unit 131 of the present embodiment functions as an acquisition unit 22, an analysis unit 23, a determination unit 24, a setting unit 25, and an output unit 26. The CPU executes a control program 34A, so that the control unit 131 also functions as an optimization unit 33. The function of each unit is the same as that in the first embodiment.

The storage unit 134 of the present embodiment stores the execution program 27A for performing, for example, the preference analysis processing and the destination determination processing, an ID information table 27B, a preference table 27C, spot list data 27D, and destination data 27E. The storage unit 134 also stores the control program 34A for performing, for example, the route optimization processing and history data 34B. The function of each unit is the same as that in the first embodiment.

The car navigation device 130 having the configuration described above completes all of the preference analysis processing, the destination determination processing, and the route optimization processing, in the vehicle 12. According to the present embodiment, a functional effect similar to that of each embodiment described above, can be obtained.

Different Embodiment

In the first and second embodiments, the retrieval start instruction transmitted from the car navigation device 30 or the transmission of the positional information acts as a trigger for performing the route optimization processing (see FIGS. 7 and 12). However, the trigger for performing is not limited to this. As a different embodiment, for example, a case in which a mobile terminal 50 registered in a center server 20 is located at the interior of a vehicle 12, may be applied to the trigger for performing the route optimization processing. As a method of detecting whether or not the mobile terminal 50 is located at the interior of the vehicle 12, for example, a short-range radio communication including Bluetooth (registered trademark) or the global positioning system (GPS) can be used.

For example, in a case in which the short-range radio communication is used, the mobile terminal 50 and a car navigation device 30 each include a short-range radio communication device. In a case in which communication is established between the mobile terminal 50 and the car navigation device 30 in the interior of the vehicle 12, it can be determined that the mobile terminal 50 is located at the interior of the vehicle 12. In a case in which the mobile terminal 50 determines that the mobile terminal 50 is located at the interior, a retrieval start instruction is transmitted from the mobile terminal 50 to the center server 20. In a case in which the car navigation device 30 determines that the mobile terminal 50 is located at the interior, the retrieval start instruction is transmitted from the car navigation device 30 to the center server 20.

For example, in a case in which the GPS is used, the mobile terminal 50 also includes a GPS device, in addition to a GPS unit 38 included in the car navigation device 30. Thus, in a case in which the mobile terminal 50 is located within a certain area centering on the vehicle 12, it can be determined that the mobile terminal 50 is located at the interior. In a case in which the mobile terminal 50 receives positional information regarding the car navigation device 30 and determines that the mobile terminal 50 is located at the interior, the retrieval start instruction is transmitted from the mobile terminal 50 to the center server 20. In a case in which the car navigation device 30 receives positional information regarding the mobile terminal 50 and determines that the mobile terminal 50 is located at the interior, the retrieval start instruction is transmitted from the car navigation device 30 to the center server 20. In a case in which the center server 20 receives the respective pieces of positional information from the car navigation device 30 and the mobile terminal 50 and determines that the mobile terminal 50 is located at the interior, each piece of processing, such as the preference analysis processing, is performed without the retrieval start instruction.

In this manner, according to the different embodiment, the center server 20 transmits the retrieval start instruction to the car navigation device 30 in a case in which the mobile terminal 50 is located at the interior of the vehicle 12. This arrangement enables the route optimization processing to be performed at the timing a specific user who is holding the mobile terminal 50 rides in the vehicle 12.

[Others]

The center server 20 as the destination information retrieval device in the first and second embodiments and the car navigation device 130 as the destination information retrieval device in the third embodiment, have been individually exemplarily described. Each embodiment may be applied with a mode of a program for causing a computer to execute the function of each unit included in each of the center server and the car navigation device. Each embodiment may be applied with a mode of a computer-readable storage medium storing this program.

In each of the embodiments, a case in which the execution of a program allows the processing according to the embodiment to be achieved with a software configuration using a computer, has been described. However, the embodiments are not limited to this. Each embodiment may be achieved with, for example, a hardware configuration or any combination of the hardware configuration and the software configuration.

The flow of processing described in each of the embodiments is exemplary, and thus deletion of an unnecessary step, addition of a new step, or replacement of the order of processing may be made without departing from the scope of the spirit.

In addition, the configuration of each of the management server and the mobile terminal described in each of the embodiments, is exemplary, and thus alteration may be made in accordance with a circumstance without departing from the scope of the spirit.

What is claimed is:

1. A destination information retrieval device, comprising:
a first memory;
a first processor connected to the first memory; and
a second processor connected to the first memory, wherein
the first processor:
acquires posted information from a management server that manages a social networking service (SNS),
determines, based on the acquired posted information and current positional information regarding a vehicle, a destination of the vehicle, and
outputs the determined destination as destination information, and;
wherein the second processor:
optimizes a traveling route of the vehicle, based on the current positional information regarding the vehicle and the determined destination of the vehicle, and
issues a notification of the optimized traveling route.

2. The destination information retrieval device according to claim 1, wherein the first processor:
acquires the posted information, which has been posted by a specific user who rides in the vehicle,
analyzes a preference of the specific user, based on the acquired posted information posted by the specific user, and determines the destination, based on the current positional information regarding the vehicle and the preference of the specific user.

3. The destination information retrieval device according to claim 2, wherein, in the first processor, the preference of the specific user is set by the specific user who rides in the vehicle.

4. The destination information retrieval device according to claim 1, wherein the first processor:
   determines, for the vehicle, an order of stopping off at a plurality of destinations, and
   outputs the destination information, to which the order of stopping off has been added.

5. A non-transitory storage medium storing a first program for causing a first processor to execute destination information retrieval processing and a second program for causing a second processor to execute route optimization processing, the destination information retrieval processing comprising:
   acquiring posted information from a management server that manages a social networking service (SNS);
   determining, based on the acquired posted information and current positional information regarding a vehicle, a destination of the vehicle; and
   outputting the determined destination as destination information; and
   the route optimization processing comprising:
   optimizing a traveling route of the vehicle, based on the current positional information regarding the vehicle and the determined destination; and
   issuing a notification of the optimized traveling route.

6. The non-transitory storage medium storing a program according to claim 5, the destination information retrieval processing further comprising:
   acquiring the posted information, which has been posted by a specific user who rides in the vehicle;
   analyzing a preference of the specific user, based on the acquired posted information posted by the specific user; and
   determining the destination, based on the current positional information regarding the vehicle and the preference of the specific user.

7. The non-transitory storage medium storing a program according to claim 6, wherein, in the destination information retrieval processing, the preference of the specific user is set by the specific user who rides in the vehicle.

8. The non-transitory storage medium storing a program according to claim 5, the destination information retrieval processing further comprising:
   determining, for the vehicle, an order of stopping off at a plurality of destinations; and
   outputting the destination information, to which the order of stopping off has been added.

9. A destination information retrieval system, comprising:
   the destination information retrieval device according to claim 1; and
   a positional information provision device capable of transmitting the current positional information regarding the vehicle to the destination information retrieval device.

10. A destination information retrieval system, comprising:
    the destination information retrieval device according to claim 1;
    a mobile terminal registered in the destination information retrieval device; and
    a positional information provision device capable of transmitting the current positional information regarding the vehicle to the destination information retrieval device,
    wherein the first processor transmits the destination information to the positional information provision device in a case in which the mobile terminal is located at an interior of the vehicle.

* * * * *